(12) United States Patent
Petersen et al.

(10) Patent No.: US 8,066,834 B1
(45) Date of Patent: Nov. 29, 2011

(54) BURN RATE SENSITIZATION OF SOLID PROPELLANTS USING A NANO-TITANIA ADDITIVE

(75) Inventors: Eric Petersen, Orlando, FL (US);
Jennifer Small, Dunlap, IL (US);
Metthew Stephens, Ft. Pierce, FL (US);
Jason Arvanetes, Crestview, FL (US);
Sudipta Seal, Oviedo, FL (US); Sameer Deshpande, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 831 days.

(21) Appl. No.: 11/498,577

(22) Filed: Aug. 3, 2006

Related U.S. Application Data

(60) Provisional application No. 60/705,395, filed on Aug. 4, 2005.

(51) Int. Cl.
*C06B 33/00* (2006.01)
*C06B 33/06* (2006.01)
*C06B 29/22* (2006.01)
*D03D 23/00* (2006.01)
*D03D 43/00* (2006.01)

(52) U.S. Cl. ........... 149/76; 149/37; 149/42; 149/108.2; 149/109.2; 149/109.4

(58) Field of Classification Search .................... 149/76, 149/37, 42, 108.2, 109.2, 109.4
See application file for complete search history.

(56) References Cited

U.S. PATENT DOCUMENTS

| | | | | |
|---|---|---|---|---|
| 3,798,087 | A * | 3/1974 | Hill | 149/19.2 |
| 3,933,543 | A * | 1/1976 | Madden | 149/21 |
| 3,986,906 | A | 10/1976 | Sayles | 149/19.4 |
| 4,522,665 | A | 6/1985 | Yates, Jr. et al. | 149/21 |
| 4,658,578 | A * | 4/1987 | Shaw | 60/205 |
| 4,881,994 | A | 11/1989 | Rudy et al. | 149/109.4 |
| 5,334,270 | A * | 8/1994 | Taylor, Jr. | 149/19.4 |
| 5,650,590 | A * | 7/1997 | Taylor | 149/17 |
| 6,086,692 | A * | 7/2000 | Hawkins et al. | 149/19.9 |
| 6,270,836 | B1 | 8/2001 | Holman | 427/126.3 |
| 6,503,350 | B2 * | 1/2003 | Martin et al. | 149/37 |
| 6,605,167 | B1 | 8/2003 | Blomquist | 149/7 |

* cited by examiner

*Primary Examiner* — James McDonough
(74) *Attorney, Agent, or Firm* — Brian S. Steinberger; Phyllis K. Wood; Law Offices of Brian S. Steinberger, P.A.

(57) ABSTRACT

Adding nanoparticles as a catalyst to solid propellant fuel to increase and enhance burn rates of the fuel by up to 10 times or more and/or modifying the pressure index. A preferred embodiment uses $TiO_2$ nanoparticles mixed with a solid propellant fuel, where the nanoparticles are approximately 2% or less of total propellant mixture. The high surface to volume ratio of the nanoparticles improve the performance of the solid propellant fuel.

7 Claims, 3 Drawing Sheets

BURN RATE SENSITIZATION OF SOLID PROPELLANTS USING A NANO-TITANIA ADDITIVE

This invention claims the priority of U.S. Provisional Patent Application No. 60/705,395 filed on Aug. 4, 2005.

STATEMENT REGARDING FEDERALLY SPONSORED RESEARCH

The subject invention was made with government support under National Science Foundation contract: NSFEEC0139614. The government has certain rights in this invention.

FIELD OF THE INVENTION

This invention relates to nanoparticles, in particular to methods of making and using nanoparticle additives such as $TiO_2$ as catalysts to enhance solid propellant burn rates where the high surface-to-volume of the nanoparticles provides greater benefit over traditional additives.

BACKGROUND AND PRIOR ART

Additives comprising fractions of a percent to several percent of solid propellant mixtures have been considered through the years and are commonly employed in many rocket propellants and explosives. Various additives include burn-rate modifiers (e.g., ferric oxide, metal oxides, and organometallics); curing agents; and plasticizers. In certain cases, additions of small (<5% by weight) amounts of powdered material to the propellant mixture have been shown to increase or otherwise favorably modify the burn rate as described in T B Brill, B T Budenz 2000 "Flash Pyrolysis of Ammonium Percholrate-Hydroxyl-Terminated-Polybutadiene Mixtures Including Selected Additives," Solid Propellant Chemistry, Combustion, and Motor Interior Ballistics, Vol. 185, Progress in Astronautics and Aeronautics, V Yang, T Brill, W-Z Ren (Ed.), AIAA, Reston, Va.: 3-32. For example, it has been observed by a few investigators that TiO2 (titania) particles may enhance stability by creating burn rates that are insensitive to pressure over certain pressure ranges as disclosed in U.S. Pat. No. 5,579,634 issued to Taylor on Dec. 3, 1996. It is suspected that other organometallic particles may produce these and other favorable traits described in Brill. Nanoparticle additives may have an even further influence on the burn rate because of their high surface-to-volume ratios.

Over the past few years, nanoparticles of many different compounds and combinations have received considerable attention in the scientific and engineering research communities. This surge of activity is a result of the many favorable characteristics certain materials and applications exhibit when nanoparticles are involved in some fashion. Benefits are certainly seen in composite Al/AP/HTPB-based solid propellant formulations when the micron-scale metal fuel (i.e., Al) is replaced by nanoscale particles as described in P Lessard, F Beaupré, P Brousseau, 2001 "Burn Rate Studies of Composite Propellants Containing Ultra-Fine Metals," Energetic Materials—Ignition, Combustion and Detonation, Karlsruhe, Germany; 3-6 Jul. 2002: 88. pp. 1-13 and in A Dokhan, E W Price, J M Seitzman, R K Sigman, "Combustion Mechanisms of Bimodal and Ultra-Fine Aluminum in AP Solid Propellant," AIAA Paper 2002-4173, July 2002. However, little research has been done on the effect of nanosized additives such as organometallics and related burn rate-enhancing and smoke-reducing compounds.

Other prior art made of record includes U.S. Pat. No. 6,503,350 issued to Martin on Jan. 7, 2003, describes propellants such as may be used in solid rocket motors. In one preferred embodiment, the propellant comprises one high energy propellant composition comprising a homogeneous mixture of fuel and oxidizer having a predetermined fuel/oxidizer ratio, wherein individual fuel particles are generally uniformly distributed throughout a matrix of oxidizer, and a low energy propellant comprising a fuel and oxidizer. The amounts of the two propellants are present in amounts which achieve a preselected burn rate.

U.S. Pat. No. 6,605,167 issued to Blomquist on Aug. 12, 2003, discloses an autoignition material that includes a plurality of agglomerates. Each agglomerate comprises an oxidizer material particle. A plurality of metal fuel particles are disposed on the oxidizer material particle. The metal fuel particles are present in a weight ratio effective to chemically balance the oxidizer material particle. The metal fuel particles exothermically react with the oxidizer material particle when the autoignition material is exposed to a temperature of about 80.degree. C. to about 250.degree. C. A thin binder film adheres the metal fuel particles to the oxidizer material particle and maintains the metal fuel particles in intimate contact with the oxidizer particles.

U.S. Pat. No. 6,270,836 issued to Holman on Aug. 7, 2001, describes sol-gel preparation of particles. The gel-coated microcapsules have improved mechanical stress- and flame-resistance. A method for making the gel coated microcapsules is also provided. Phase change materials can be included in the microcapsules to provide thermal control in a wide variety of environments.

U.S. Pat. No. 6,086,692 issued to Hawkins, et al. on Jul. 11, 2000, describes an advanced design for high pressure, high performance solid propellant rocket motors and describes a solid rocket propellant formulation with a burn rate slope of less than about 0.15 ips/psi over a substantial portion of a pressure range and a temperature sensitivity of less than about 0.15%/.degree F. A high performance solid propellant rocket motor including the solid rocket propellant formulation is also provided. The solid rocket propellant formulation can be cast in a grain pattern such that an all-boost thrust profile is achieved.

U.S. Pat. No. 4,881,994 issued to Rudy, et al. Nov. 21, 1989, discloses ferric oxide as burn rate catalyst and use of isocyanate curing agent. The patent describes a method of making a ferric oxide burning rate catalyst that results in a highly active, finely divided burning rate enhancing catalyst. The ferric oxide burning rate catalyst is particularly adapted for use in a composite solid rocket propellant. This process provides an ultra pure, highly active, finely divided burning rate catalyst.

U.S. Pat. No. 4,658,578 issued to Shaw, et al. on Apr. 21, 1987, discloses improved igniter compositions for rocket motors are provided which, when cured, are non-volatile and are capable of igniting under vacuum conditions and burning steadily at reduced pressures.

U.S. Pat. No. 4,655,858 issued to Sayles on Apr. 7, 1987, describes metal/oxidant agglomerates for enhancement of propellant burning rate are prepared from a finely divided metal (aluminum, boron, titanium, etc.), ammonium perchlorate, and a small quantity of the same binder material that goes into the manufacture of the propellant, such as, hydroxyl-terminated polybutadiene crosslinked with a polyisocyanate.

SUMMARY OF THE INVENTION

A primary objective of the invention is to provide methods, systems, apparatus and devices to provide a titania nanoparticle additive for composite solid propellants.

A secondary objective of the invention is to provide methods, systems, apparatus and devices to provide a titania nanoparticle additive for composite solid propellants for improved performance due to their high surface to volume ratio.

A third objective of the invention is to provide new methods, systems, apparatus and devices for the addition of titania nanoparticle additives at about 0.4% of the total propellant mass to produce an impact on the burn rate of solid propellants up to ten times or more at various pressures.

A first preferred embodiment of the invention provides a composite solid propellant having a catalyst. Nanoparticles of $TiO_2$ additive are mixed with solid propellant fuel to produce a final propellant mixture, wherein the nanoparticles of $TiO_2$ act as the catalyst to modify the burn rate of the composite solid propellant. The $TiO_2$ additive is less than approximately 2.0% of the composite solid propellant by mass.

For the second embodiment, the novel method for enhancing solid propellant burn rates that includes the steps of providing a solid propellant fuel and nanoparticles of $TiO_2$ additive as a catalyst, and mixing the nanoparticles of $TiO_2$ additive with the solid propellant fuel to modify burn rate of the fuel. The nanoparticles of $TiO_2$ additive are produced by first mixing Isopropanol anhydrous and 2,4-Pentanedione together, mixing titanium Isoproproxide with the solution, then mixing DI water for hydrolysis to produce a final mixture. The final mixture is aged to produce the nanoparticles of $TiO_2$ additive.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The apparatus, methods, systems and devices of the present invention encompassed adding nanoparticles of $TiO_2$ as a catalyst to solid propellant fuel such as R-45 Binder, MDI Cure Agent, monomodial Ammonium perchlorate ($Fe3O_2$). A preferred mixture has nanoparticles being approximately 0.4% of total propellant mass of the mixture, where that catalyst can increase and enhance burn rates of the fuel up to ten times or more. The high surface-to-volume ratio of the nanoparticles have an important impact on the performance of the solid propellant fuel.

Figure 1:
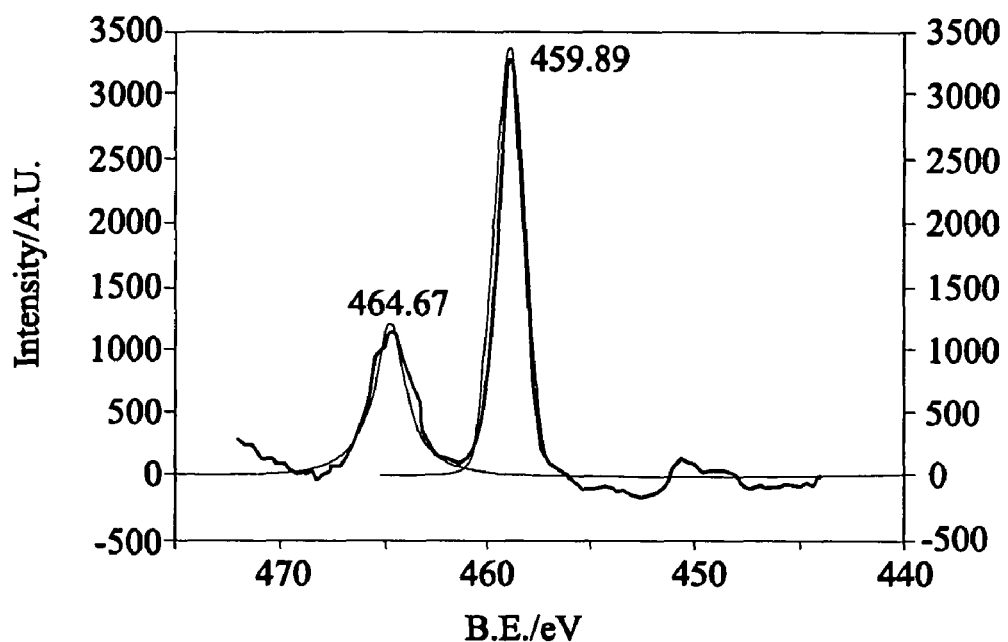
FIG. 1 is a graph showing the deconvoluted Ti(2p) peaks obtained from nano-$T_iO_2$ power synthesized using the sol-gel technique.
Figure 3:
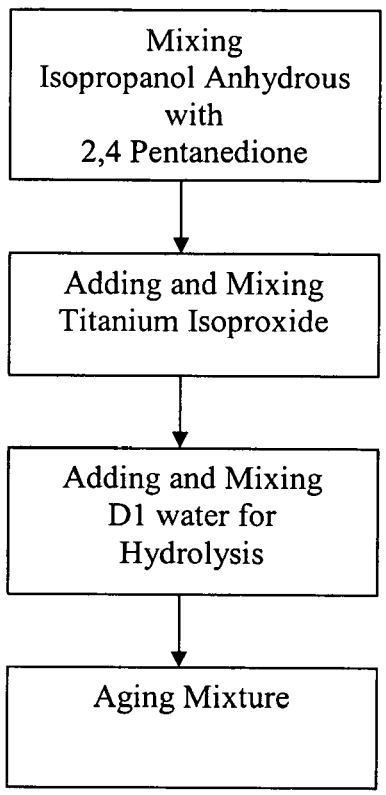
FIG. 3 is a flow diagram of the procedure for producing nanoparticles.

Materials for the synthesis of the $TiO_2$ particles included Isopropanol anhydrous, 2,4-Pentanedione, and Titanium isopropoxide purchased from Sigma Aldrich. Deionized (DI) water was also used. The procedure for the $TiO_2$ particles involved a sol-gel technique. As shown in FIG. 3, the technique is based on the hydrolysis of liquid precursors and the formation of colloidal sols. Specifically, 100 ml of Isopropanol anhydrous and 2 ml of 2,4-Pentanedione were added together and stirred for 20 minutes. Titanium Isopropoxide was then added to the solution and stirred for 2 hours. DI water was then added for hydrolysis and stirred for an additional 2 hours, and the solution was left to age for 12 hours. This procedure produced a yield of 1.6 g of nanoparticles. X-Ray Photoelectron Spectroscopy (XPS) was used to verify the chemical structure of the TiO2 particles. The resulting XPS data confirm the formation of $TiO_2$ particles due to the 2p3 peak at 458.89 eV of binding energy (FIG. 1) according to typical peak formation for $TiO_2$. Transmission Electron Microscopy (TEM) (Philips Technai transmission electron microscope) was also used to study the size and distribution of the particles. The TEM results revealed nano-sized arrays of particles with diameters on the order of 10 nm with a narrow size distribution.

Figure 4:
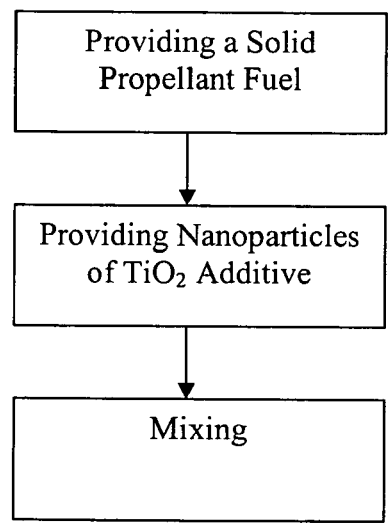
FIG. 4 is a flow diagram of the procedure for enhancing solid propellant burn rates using the nanoparticles of TiO2 produced using the procedure shown in FIG. 3.

As shown in the flow diagram of FIG. 4, the procedure for enhancing solid propellant burn rates involves providing a solid propellant fuel and mixing in the nanoparticles of TiO2 produced using the procedure shown in FIG. 3. For the final propellant mixture, the amounts for each component consisted of the following by mass: the fuel (3-μm Al+titania additive) was 20%, the oxidizer (200-μm monomodal Ammonium Perchlorate, AP) was 67.5%, Fe3O2 was 0.5%, the R-45M binder (HTPB) was 10.5%, and the cure agent (MDI) was 1.5%. The $TiO_2$ additive was 2.0% of the fuel by mass, or 0.4% of the entire mixture.

Figure 5:
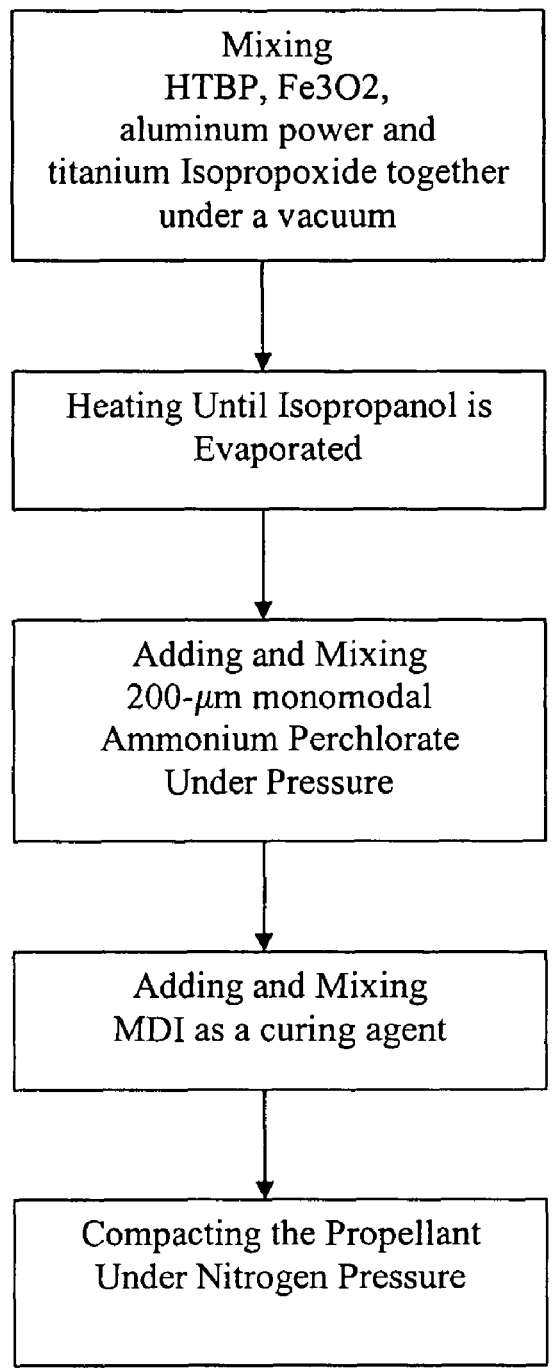
FIG. 5 is a flow diagram of a method of producing a composite solid propellant.

FIG. 5 is a flow diagram of a method of producing a composite solid propellant.

The mixing procedure began by mixing all components into the mixer, starting with the HTPB followed by the $Fe_3O_2$, the aluminum powder, and the titania solution. The mixture was mixed for 20 minutes under a vacuum and then left under the vacuum until the solvent was completely evaporated (2 days). Heating tape was applied to the mixture to heat the mixing vessel to 50° C. to help evaporate the Isopropanol solvent from the titania solution. After all of the Isopropanol was evaporated, the AP was added, and the mixture was mixed under vacuum for 25 minutes. The MDI curing agent was added, and mixing continued for 5 minutes. The mixture was put under Nitrogen pressure at about 10 atm to compact the propellant for extruding. Teflon tubing with a 6.4-mm outer diameter was used to extrude the propellant samples from the mixture for burn testing. Several strands were extruded and left to cure for 2 days at room temperature. A high-pressure strand burner was used to measure the burn rate of the propellant samples.

Burn rates were determined from two different measurements: pressure and light emission. Both diagnostics provide information leading to the total burn time. The burn rates (cm/s) were calculated by dividing the measured length of each sample by the total burn time. Further details on the propellant mixing and burning apparatus and procedures are described in R. Carro et al., "High-Pressure Testing of Composite Solid Propellant Mixtures: Burner Facility Characterization," AIAA Paper, 41st AIAA/ASME/ASEE Joint Propulsion Conference & Exhibit (2005).

Figure 2:
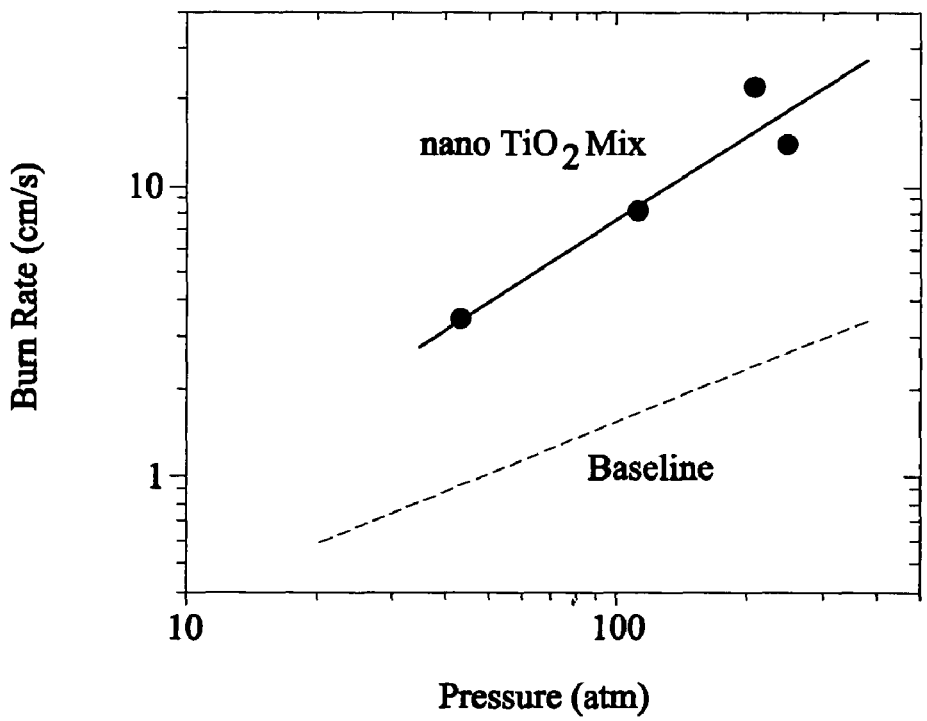
FIG. 2 is a graph showing the burn rate results for nanoparticle titania additive and baseline mixture with no titania.

The propellant samples were burned in the strand burner at pressures ranging from 43 to 250 atm. FIG. 2 presents the burn rate results of the present mixture containing the nano- Titania compared to the results of a baseline mixture from a separate study described in J Arvanetes et al., "Burn Rate Measurements of AP-Based Composite Propellants at Elevated Pressures," 4th Joint Meeting of the U.S. Sections of the Combustion Institute (2005) containing no additive. In other words, the entire fuel composition was Al. The mixture with the $TiO_2$ nanoparticles shows a significant increase in the burn rate as a function of pressure—almost a factor of ten over a range of pressures. This increase in the burn rate may come from the fact that titania nanoparticle additives greatly increase the surface area to volume ratio of the titania additive. The titania nanoparticles acted as catalysts to the burning rate.

The results confirm that the addition of titania nanoparticle additives at about 0.4% of the total propellant mass has a definite impact on the burn rate of solid propellants at various pressures. Future studies are required to further verify these results, including repetition of titania nanoparticle burns with larger pressure ranges, experimentation on the percentage of additive used in the propellant, consideration of other organometallic nanoparticle additives, conduction of new suspension methods of additives in various solvents, and exploration of structural characteristics and physical properties of the final product.

The application of nanotitania to solid propellants is not limited to AP/HTPB/Aluminum mixtures only, but can be applied to non-metallized composite propellant mixtures (i.e., no aluminum) of AP/HTPB. Other oxidizers and binders in place of AP (ammonium perchlorate) and HTPB (Hydroxyl-terminated Polybutadiene) can be used as the baseline composite propellant.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A composite solid propellant having a catalyst, consisting essentially of:
   a composite solid propellant fuel; and
   uncoated nanoparticles of $TiO_2$ additive consisting of nano-sized arrays of particles are mixed with the solid propellant fuel to produce a final propellant mixture having 0.4% of nanoparticles of $TiO_2$ consisting of nano-sized arrays of particles with a diameter of 10 nanometers or less, wherein the uncoated nanoparticles of $TiO_2$ act as the catalyst to increase the burn rate of the composite solid propellant for enhancing solid propellant burn rates that do not exhibit bi-plateau burning behaviors.

2. The composite solid propellant having the catalyst of claim 1, wherein the composite solid propellant fuel consists of:
   Ammonium Perchlorate (AP) and HTPB binder if nonmetallized, and AP, HTPB, Aluminum fuel, and Fe2O3 catalyst if metallized.

3. The solid propellant having the catalyst of claim 1, wherein the materials for the synthesis of the $TiO_2$ nanoparticles includes Isopropanol anhydrous, 2,4-Pentanedione, and Titanium isopropoxide.

4. A composite solid propellant having a catalyst consisting essentially of
   a composite solid propellant fuel; and
   uncoated nanoparticles of $TiO_2$ additive consisting of nano-sized arrays of particles with a diameter of 10 nanometers or less mixed with the solid propellant fuel wherein the $TiO_2$ nanoparticles comprise:
   Isopropanol anhydrous mixed with 2,4-Pentanedione to produce a first mixed solution;
   a titanium Isoproproxide mixed with the first mixed solution to produce a second mixed solution; and
   a deionized water mixed with the second mixed solution for hydrolysis to produce a final mixture, wherein the final mixture is aged to produce approximately 1.6 gram of nanoparticles of $TiO_2$ additive for enhancing solid propellant burn rates that are not bi-plateau burning behaviors.

5. The composite of claim 4 wherein the first mixed solution comprises:
   approximately 100 ml of Isopropanol anhydrous; and
   approximately 2 ml of 2,4-Pentanedione mixed together by stirring for approximately 20 minutes.

6. The composite of claim 1, wherein mass percentage of the additive is between 0.4 to 2% of total propellant mass.

7. The composite of claim 4, wherein mass percentage of the additive is between 0.4 to 2% of total propellant mass.

* * * * *

UNITED STATES PATENT AND TRADEMARK OFFICE
CERTIFICATE OF CORRECTION

| | | |
|---|---|---|
| PATENT NO. | : 8,066,834 B1 | Page 1 of 1 |
| APPLICATION NO. | : 11/498577 | |
| DATED | : November 29, 2011 | |
| INVENTOR(S) | : Eric Petersen | |

It is certified that error appears in the above-identified patent and that said Letters Patent is hereby corrected as shown below:

In the Specification

Column 1, lines 11-14, should read,

STATEMENT REGARDING FEDERALLY SPONSORED RESEARCH OR DEVELOPMENT

This invention was made with Government support under Agency contract EEC0139614 awarded by the National Science Foundation. The Government has certain rights in this invention.

Signed and Sealed this
Twenty-fifth Day of February, 2014

Michelle K. Lee
*Deputy Director of the United States Patent and Trademark Office*